Patented Apr. 28, 1936

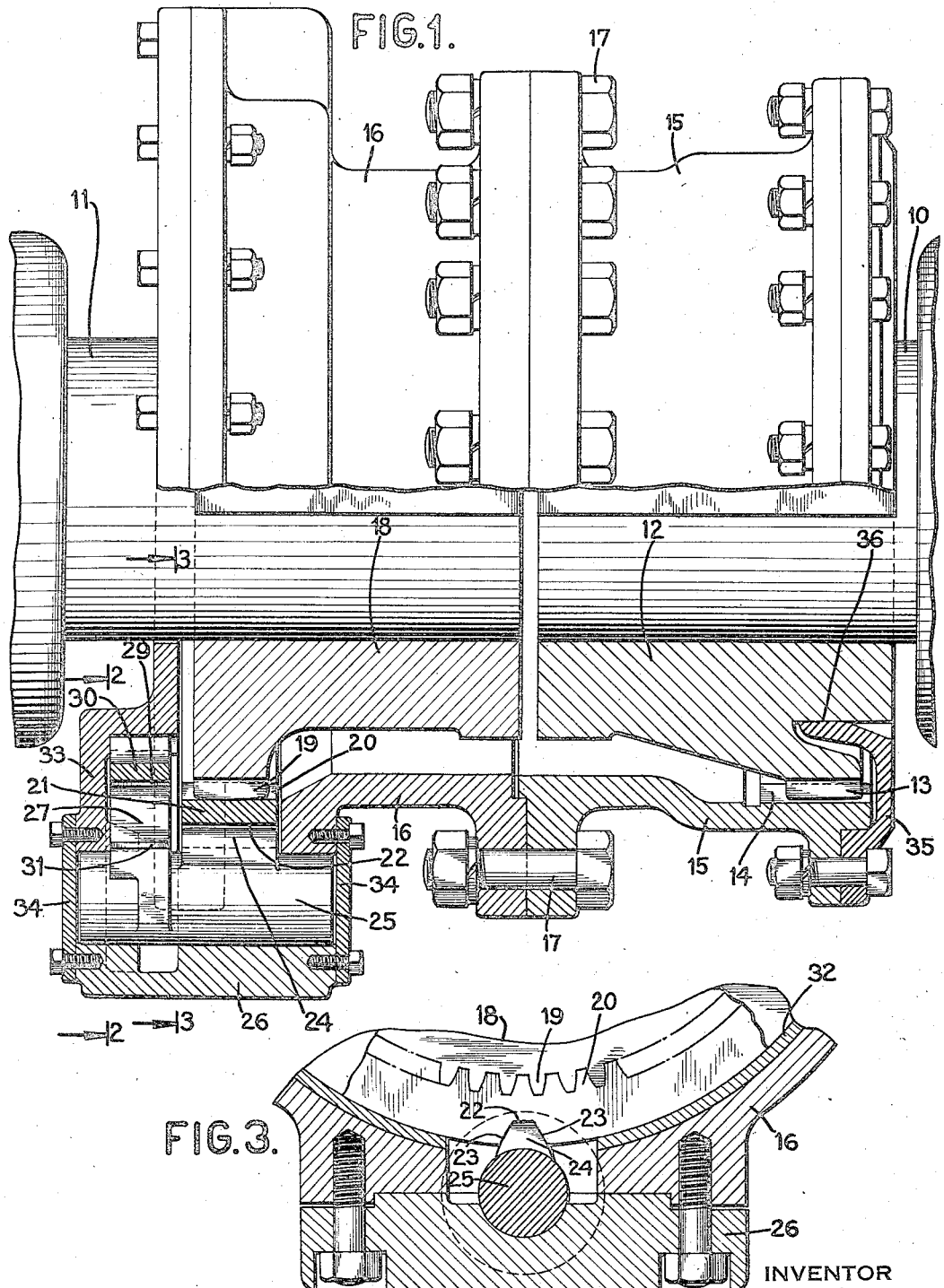

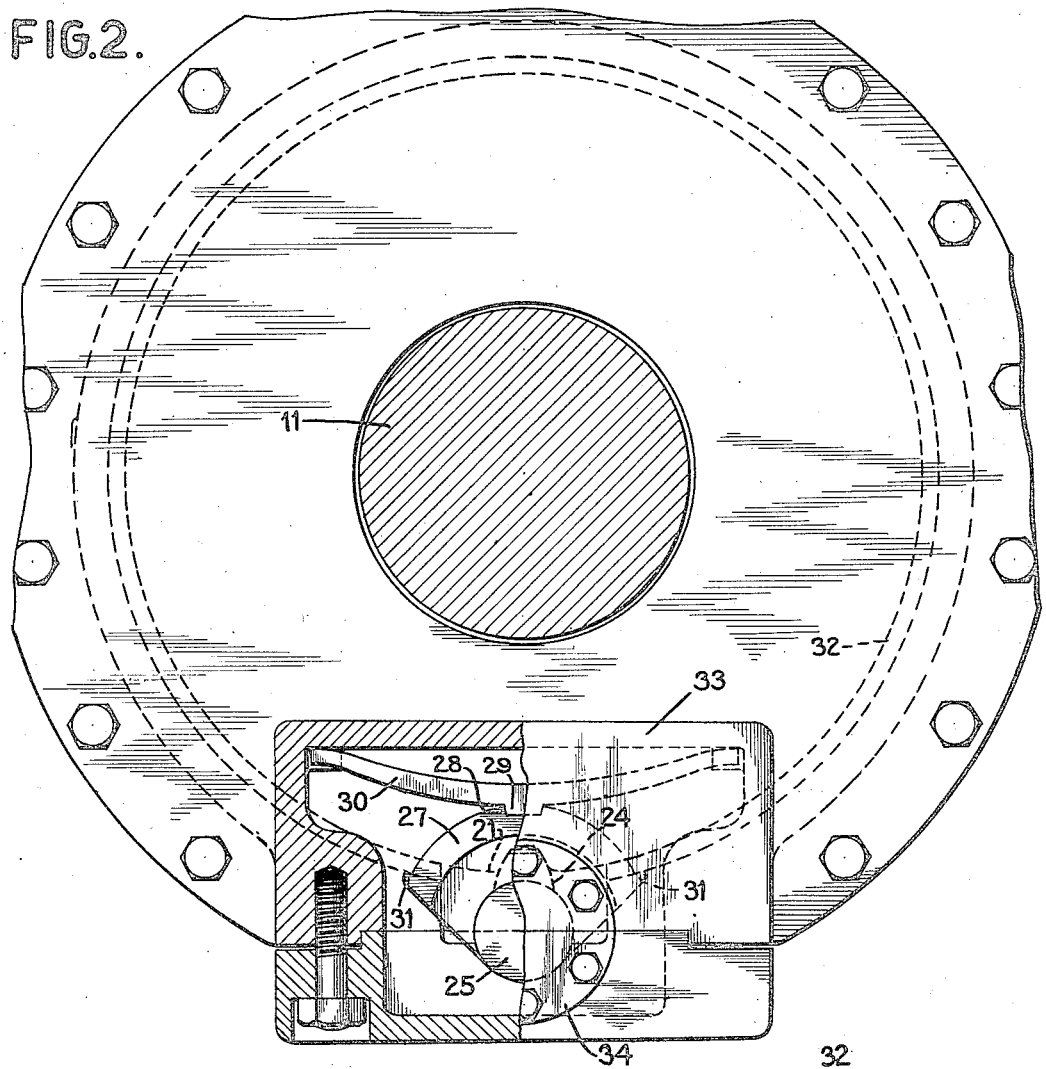
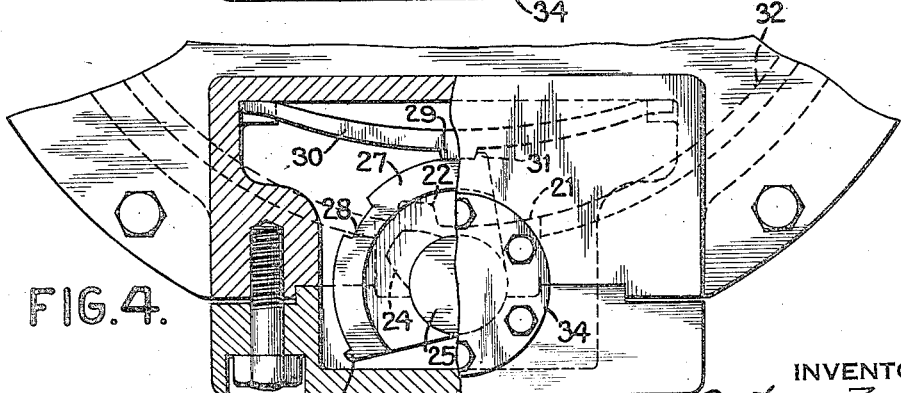

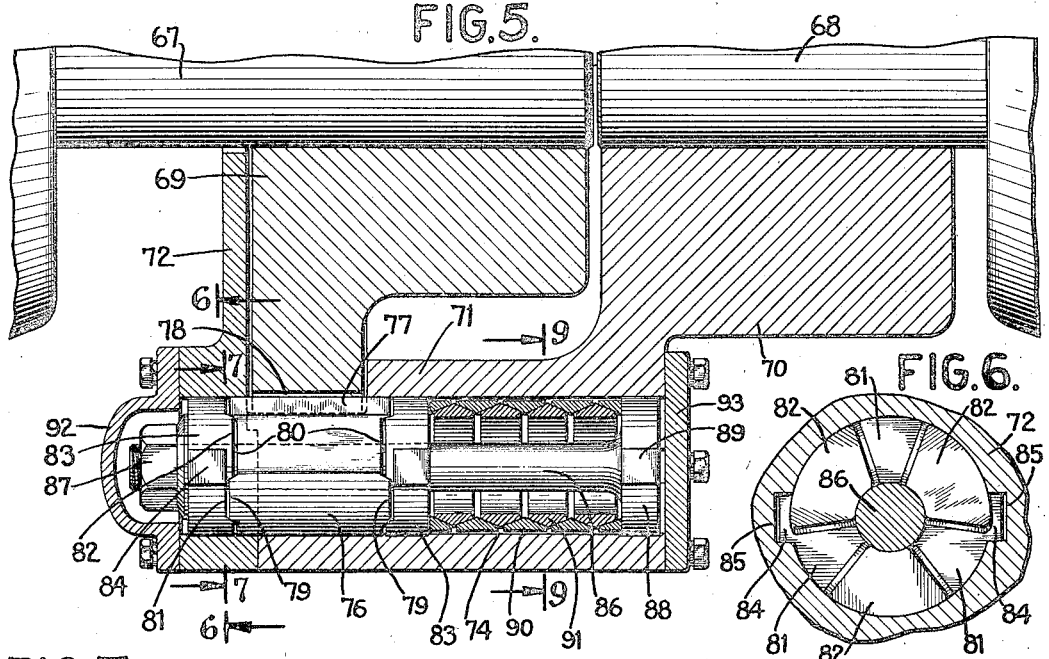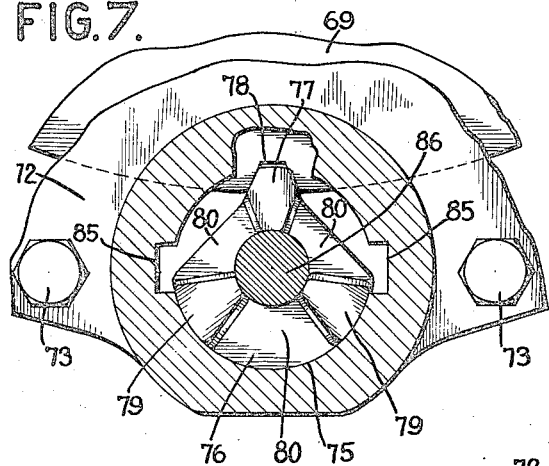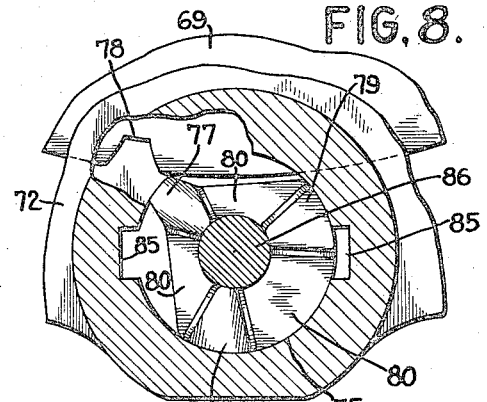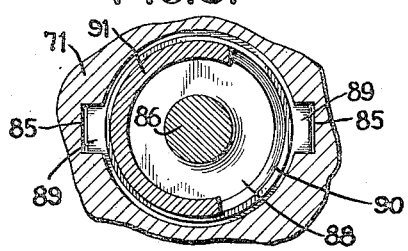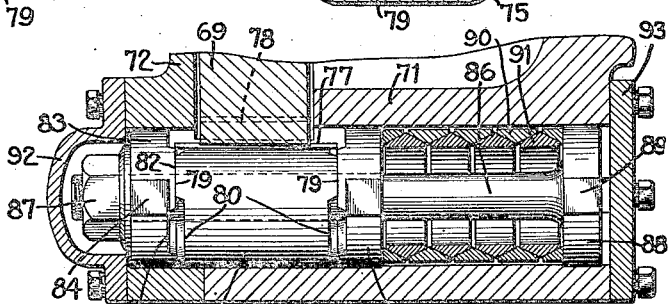

2,038,896

UNITED STATES PATENT OFFICE 2,038,896

OVERLOAD RELEASE COUPLING

Gustave Fast, Annapolis, Md., assignor to Gustave Fast Engineering Corporation, Annapolis, Md., a corporation of Maryland Application June 12, 1931, Serial No. 543,866

5 Claims. (Cl. 192—56)

This invention relates to coupling devices adapted to transmit a predetermined amount of torque between a pair of rotatable members and which will yield upon the placing of an excessive load upon the driven member so as to prevent serious injury to any of the parts of the machine embodying the coupling.

It has been a primary object of the present invention to provide a coupling which will be released upon the application of a predetermined overload without the use of any shear pins or similar breakable parts which require replacement upon the release of the coupling. The invention further has in view the elimination of all of the objectionable features of the shear pin type of coupling and the production of a unit which may be effectively provided with any desired overload factor. The construction contemplated is simple, compact and reliable in its action and after release may very readily be reset to permit the transmission of the desired torque.

Other features and advantages of the invention will be set forth in the claims and in the detailed description of an illustrative embodiment of the same which will now be given in conjunction with the accompanying drawings in which:

Figure 1 is a side elevational view, partly in section, of a coupling embodying the overload release mechanism of the present invention.

Figure 2 is a front elevation, partly in section, taken along the line 2—2 of Figure 1, of the improved coupling.

Figure 3 is a detail, sectional view taken along the line 3—3 of Figure 1.

Figure 4 is a detail view showing certain of the parts of Figure 2 in a shifted position.

Figure 5 is a longitudinal sectional view through a portion of a modified form of coupling.

Figure 6 is a transverse sectional view of a detail taken along the line 6—6 of Figure 5 in the direction indicated by the arrow.

Figure 7 is a view similar to Figure 6 but taken in the opposite direction along line 7—7 of Figure 5.

Figure 8 illustrates the parts shown in Figure 7 in shifted positions.

Figure 9 is a sectional view taken along the line 9—9 of Figure 5, and

Figure 10 is a view similar to Figure 5 illustrating the parts shifted as in Figure 8.

Referring now to Figures 1 to 4 of the drawings, there is shown a pair of aligned shafts 10 and 11 which are to be coupled together, one being connected either directly or through suitable means to a power driving means, and the other being connected, for example, to a pump or the like. On the shaft 10 there may be mounted a hub 12 which is keyed to the shaft for rotation therewith. This hub may be provided along its periphery with a series of teeth or spline projections 13 adapted to mesh or cooperate with internal teeth or projections 14 carried by a sleeve or housing member 15. The latter may be connected to a second sleeve or housing member 16 by means of a series of bolts 17 passed through flanges integral with the sleeves.

Through the means which will presently be described, the member 16 has a normal driving connection with a hub 18 mounted on and keyed to the shaft 11. The driving connection between these parts, however, is such that it will be released upon the application of an excessive load to the shaft 11. A series of teeth or projections 19 carried by the periphery of the hub 18 are adapted to cooperate with corresponding internal teeth or projections 20 carried by an annular member 21. The latter in its outer surface is provided with a notch or indentation 22 having sloping sides 23 and adapted to receive a projection 24 which is integral with a rotatable pin or stud 25. This stud is suitably journalled within openings provided partly within the member 16 and partly within a plate or closure member 26 bolted to a flattened portion of the periphery of member 16 adjacent its outer end. Near its left end, as viewed in Figure 1, the stud 25 is provided with a segmental projection 27, whose form is best illustrated in Figures 2 and 4. This projection is provided with a notch 28 in its outer surface, the sides of the notch being inclined at a suitable angle to a line extending radially toward the axis of the stud. A projection 29 having correspondingly tapered sides and carried by or integral with a spring member 30, which may conveniently be in the form of a flat leaf spring, is adapted to cooperate with the notch 28. It will be apparent that due to the co-action of the projection 29 with the notch 28, the projection 27, and hence the stud 25, will normally be prevented from rotation.

Through the cooperation of the projection 24 on the stud with the notch 22 in the member 21 the latter will then be constrained to move with the sleeve or housing member 16 so that the torque transmitted to the latter will in turn be transmitted to the hub 18 and shaft 11. However, should the shaft 11 meet with undue resistance to rotation, there will be a tendency for the annular member 21 to act upon the projection 24 of the stud 25 and attempt to rotate the latter within its bearings. If this turning force is sufficiently great, the side of the notch 28 in the projection 27 will cause the projection 29 of the spring member 30 to be cammed upwardly, thereby releasing the stud for partial rotation. When it has rotated through an angle of about 60 degrees, the projection 24 will have been completely disengaged from the member 21 and the driving connection between this member and the sleeve 16 will have been broken. Rotation of the stud may be limited, if desired, by an extension 31 formed on the projection 27 and adapted to cooperate with the projection 29 of the spring 30 after the stud has rotated sufficiently to release the coupling. The parts will remain in released position during continued rotation of the shaft 10 and until they are readjusted to bring the necessary projections and notches into alignment.

In order to prevent excessive wear of the cooperating faces of either member 16 or the annular member 21 during the relative movement of these parts after the coupling has been released, a liner 32 of any suitable bearing material, such as bronze or Babbitt metal, may be provided between these surfaces, or the member 21 may be made of bronze and no lining such as 32 used.

It will be desirable to have the coupling partially filled with a suitable lubricant and for the purpose of retaining the same within the housing formed by the sleeve members 15 and 16, a closure element 33 of suitable construction is provided at the left end of the member 16, as best shown in Figure 1. Removable plates 34, bolted to the sleeve 16 and cover 33, may be provided in line with the stud 25 to permit ready access to the latter. At the opposite end of the coupling a closure 35 may be provided and bolted, or fastened in any other suitable way, to the sleeve member 15. The radially inward facing surface 36 of the cover 35 which cooperates with a portion of the hub 12 is preferably rounded slightly so as to permit a certain amount of angular movement between the shaft 10 and the sleeve member 15. A similar limited, angular movement is permitted between the shaft 11 and the sleeve 16 by a slight rounding of the ends of the projections 19 on the hub 18 which, it will be noted, is at a point radially in line with the projection 24 of the stud 25. In the event of a release of the coupling the lubricant in the housing will work its way between the relatively sliding surfaces of the members 21 and 32 to prevent undue wear.

After the coupling has been released, in the manner indicated, it may be restored to its normal coupling condition by properly aligning and meshing the notch 22 in the ring 21 with the projection 24. When these parts are brought into proper relation, the projection 29 of the spring 30 will drop into the notch 28 of the projection 27. It will be noted that the projection 27 is provided with symmetrical portions on the two sides of the notch 28 and that the balance of the mechanism is similarly symmetrically arranged so that the coupling may be released during rotation of the parts in either direction.

The construction illustrated in Figures 1 to 4 has the advantage of providing only a single driving projection between the sleeve or housing member and the corresponding hub. This eliminates the necessity of insuring the simultaneous action of a series of projections. It is to be noted in this connection that the radial distance from the axis of the stud 25 (Fig. 3) to the point at which the force is applied to the projection 24 by the side of the notch 22 is considerably shorter than the distance from this point of engagement to the center of the shaft 11. Furthermore, the first mentioned distance is less than that from the center of the stud to the point of contact between the spring projection 29 and the side wall of the notch 28. In this way a considerable mechanical advantage is derived in favor of the projection 29 so that the projection 24 is enabled to transmit a force to the shaft 11 of considerable magnitude without causing release of the coupling. By an appropriate variation of these distances, as well as by a variation in the slope of the sides of the notch 28 and the strength of the spring 30, the load at which the coupling will be released may be readily varied to suit the particular requirements.

In Figures 5 to 10, inclusive, there is shown a further modification of the invention in which the parts, which are separated by a camming action against a resilient force to release the coupling under conditions of excessive load, are moved axially with respect to the coupled shafts rather than radially as in the previously described embodiments. The two shafts to be coupled are designated 67 and 68, respectively, in Figure 5 and on each there is secured a hub or similar member for rotation therewith. For example, a member 69 may be keyed to the shaft 67 while a member 70 may be keyed to the shaft 68. An annular extension 71 of the member 70 surrounds the member 69 and in conjunction with the plate or closure 72, which is fastened by bolts 73, or the like, to the member 70, it may serve to completely enclose the member 69. Within the annular extension 71 there may be formed one or more cylindrical pockets 74 having their axes parallel to the common axis of the coupled shafts. Each pocket 74 may be provided with a substantially cylindrical interior surface 75 which receives and cooperates with a corresponding surface on the periphery of a quill shaft 76. The latter carries an elongated tooth-like projection 77 which is adapted to cooperate with a groove or notch 78 formed in the exterior surface of the member 69. It will be apparent that so long as the projection 77 remains in engagement or mesh with the groove 78, a driving relation will exist between the members 69 and 70.

For the purpose of holding the projection 77 and notch 78 in properly meshed relation, as shown in Figure 7, a suitable resilient detent mechanism is provided. This may include the provision of face cams comprising axially extending projections 79 formed preferably at both ends of the quill shaft 76 with alternate depressions 80 between the projections. Cooperating with these face cams there may be provided complementary face cams formed by depressions 81 and projections 82 carried by a pair of disc-like members 83. These members may be permitted a slight axial, sliding movement but are held against rotation within the pockets 74 by means of projections at opposite sides cooperating with guide grooves 85 formed in the wall of the cylindrical pocket 74 and in the extension of this wall formed in the cover element 72. The quill shaft 76 and the two disc-like members 83 are slidably carried by a rod 86 which at one end is preferably threaded and adapted to receive a nut 87 and at its opposite end is provided with an enlarged head 88 corresponding in form to the elements 83. Projections 89, similar to the projections 84, extend laterally from the head 88 and are adapted to cooperate with the grooves 85 to prevent rotation of the rod.

Between the inner element 83 and the head 88 there may be provided any suitable form of spring or similar resilient means. In the drawings, there is shown a type of resilient means, including sets of outer, elastic or resilient rings 90 and inner, elastic or resilient rings 91. These rings, as shown in Figures 5, 9 and 10, are provided with inclined, cooperating faces which are at a relatively small angle, preferably between 15° and 30° to the axis of the rings. It will be apparent that relative axial movement of the rings will be yieldingly resisted. Any axial movement which may take place between the rings due to the relative movement of the inner disc 83 toward the head 88 will cause the inclined, cooperating surfaces of the rings 90 to produce a wedging action upon the inner rings 91 so as to compress the latter. The inner rings in turn will tend to produce an outward wedging action upon the rings 90, tending to expand these. Due to the stresses and strains which are thus set up in the two sets of rings, energy will be stored in the same and this energy will be effective to provide quick release of the rings when the element 83 and head 88 are again separated. It will be apparent that the operation of the rings is such that there is provided both a resilient opposition to the movement of the element 83 and head 88 toward each other and a frictional resistance to this relative movement due to the sliding of the camming or wedging surfaces of the rings as they are shifted axially. Both sets of rings 90 and 91 are complete, unbroken, annular members formed preferably of material having high elastic or resilient properties. The rings 90 should be formed of material which has high elasticity or resilience under tensile or expanding forces, while the rings 91 should have high elasticity or resilience under compressional forces.

The operation of this form of the invention will be apparent. Under normal conditions the torque will be transmitted between the shafts 67 and 68 through the inter-engagement of the projection 77 with the groove 78. However, when an excessive torque is encountered, the quill shaft 76 may be rotated slightly from the position shown in Figure 7 to that shown in Figure 8. In rotating the quill shaft about the rod 86, the projections 79 of the face cams will force the two elements 83 apart. The outer element 83 will, through cooperation with the nut 87, shift the rod 86 to the left, thus drawing the head 88 toward the inner element 83. This will result in the relative, axial movement of the rings 90 and 91, which is resisted, as previously explained, by the resilience of the rings, as well as by the friction between the cooperating, sliding faces. When the quill shaft has been shifted to the position shown in Figure 10, it will be held in that position by the cooperation of the end faces of the projections 79 and 82, as shown in Figure 10. This will permit free or independent rotation of the two shafts until the parts are re-set.

In re-setting the parts it is simply necessary to bring the groove 78 into mesh with the projection 77, the quill shaft being rotated, in so doing, into the position shown in Figure 7. At this time, if desired, the nut 87 may be backed off along the threaded portion of the rod 86 to release the pressure between the rings 90 and 91.

The load under which the coupling will be automatically released, in the manner explained, may be varied in a number of ways. In the initial construction of the coupling the torque which may be transmitted through the quill shaft may be varied to suit the particular requirements by adopting a proper ratio between the radii from the axis of the quill shaft to the center of pressure of the projection 77 and from the axis of the shaft 67 to the center of pressure of the groove 78. The load at which release will be automatically effected may also be made to suit particular requirements by proper inclination of the camming edges of the projections 79 and 82. Variation in the permissible torque which may be transmitted through any given coupling after construction may be effected at will by tightening or loosening the nut 87. It will be apparent that if this nut is tightened to provide a greater initial tension upon the spring formed by the rings 90 and 91, the load under which release would be automatically effected will be increased.

In order to permit proper lubrication of all of the parts at a time when relative movement takes place between them, the cylindrical pockets 74 are preferably provided at one end with a removable cover 92 and at the opposite end with a cover-plate 93. These may be secured in any suitable way, as by means of the bolts shown. Oil or other lubricant may thus be retained within the housing formed by the coupling.

While this form of the invention has been described with reference to only a single quill shaft 76, it will be understood that two or more of these shafts may be provided if desired to enable the transmission of a greater torque through a construction of given diameter. In the illustrated form of this modification of the invention the member 70 is shown as provided with an integral annular extension surrounding the member 69; however, this part of the construction may, if desired, be made similar to that of the form shown in Figure 1. In that event the cylindrical pocket 74 will be carried by a separate sleeve member which will surround the hub elements keyed to the alined shafts and will be splined to these hub elements.

While several admirable embodiments of the invention have been disclosed in considerable detail, it will be understood that numerous variations, in addition to those already mentioned, may be adopted without departing from the general spirit and scope of the invention.

What I claim is:

1. An overload release coupling for a pair of rotatable shafts which comprises a member continuously connected with one of said shafts, a second member continuously connected with the other of said shafts, a rotatable stud carried by one of said members, a projection integral with said stud intermediate its ends adapted to engage a recess in the other of said members, and yielding means comprising a pair of spring urged elements engaging the ends of said stud for normally preventing rotation of said stud to enable positive transmission of a torque between said members, said means being adapted to yield to disconnect said members upon receipt of an excessive load.

2. An overload release coupling for a pair of rotatable shafts comprising a member connected for rotation with each shaft, inter-engaging means carried by said members adapted to positively transmit a torque between the same, said means including a rockable stud carried by one of said members and resilient means comprising a plurality of axially shiftable unbroken rings adapted to oppose disengagement of said interengaging means.

3. An overload release coupling for a pair of rotatable shafts which comprises a member connected for rotation with each shaft, an element pivotally carried by one of said members upon a pivot parallel with said shafts and having a part adapted to engage the other member, means for retaining said element in engagement with the other member to effect a positive connection between the members comprising resilient means having its axis parallel to that of said shafts, and camming surfaces on said element at an angle of less than 45 degrees to the axis of its pivot for overcoming said retaining means when a predetermined torque is exceeded.

4. An overload release coupling for a pair of elements to be coupled which comprises a member continuously connected with one of said elements, a second member continuously connected with the other of said elements, one of said members having a notch formed therein, a stud parallel with the axes of said elements movably carried by the other of said members, said stud having an inwardly extending integral projection adapted to engage said notch and provide a positive connection between said elements, resilient means cooperating with said stud at a point further from the axis thereof and nearer the axis of said elements than the end of said projection for normally holding said notch and projection in engagement, and cam means effective upon the application of a predetermined load to said coupling for opposing said resilient means and releasing the coupling.

5. An overload release coupling between driving and driven members which comprises an elongated stud rockably mounted in one of said members adjacent the periphery thereof, a projection extending radially inwardly from said stud and arranged to engage a notch in the other of said members to positively connect said members for rotation in unison in either direction, steep, substantially flat cam surfaces formed on said stud adjacent one end, at least a part of said surfaces being between the axis of the stud and the axis of said members, and a spring urged projection having corresponding cam faces cooperating with said cam surfaces, said surfaces and faces being arranged at such an angle as to act at a mechanical advantage in resisting turning of said stud, said spring urged projection being adapted to yield under the action of said cam surfaces to permit rocking of said stud when a predetermined load is exceeded.

GUSTAVE FAST.